Oct. 13, 1959
A. F. BUJAN
2,908,274
CLOSURE
Filed June 29, 1953
2 Sheets-Sheet 1
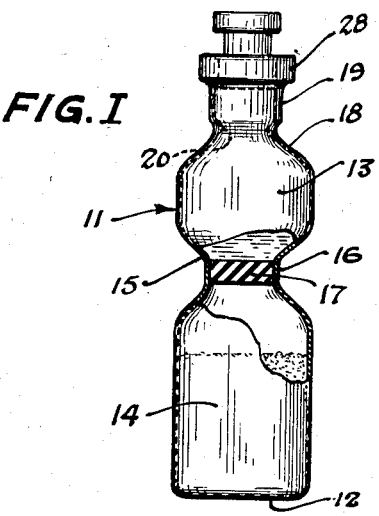
FIG. I
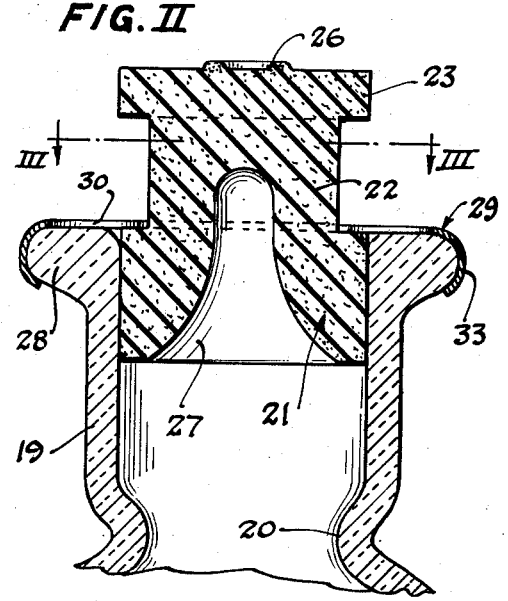
FIG. II
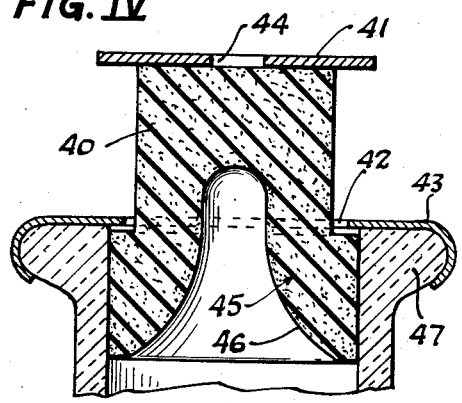
FIG. IV
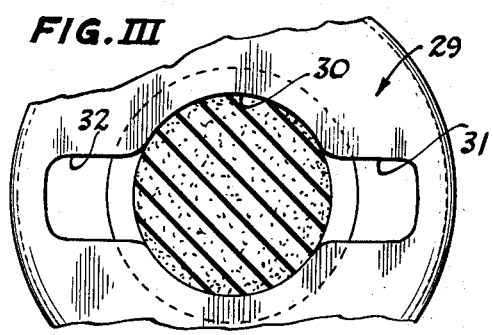
FIG. III
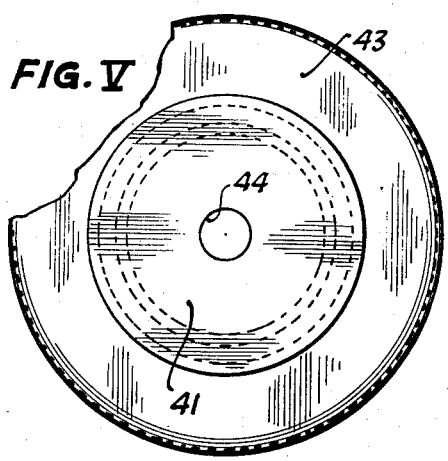
FIG. V
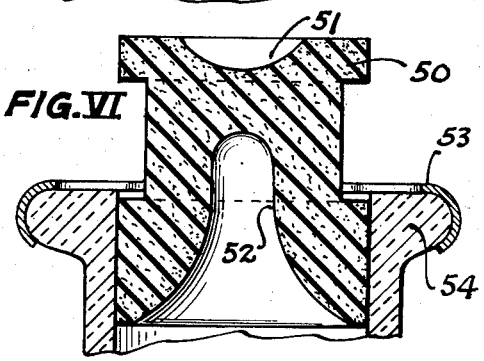
FIG. VI
Inventor
ALBERT F. BUJAN
By William E. Dominick
Attorney Oct. 13, 1959 — A. F. BUJAN — 2,908,274
CLOSURE
Filed June 29, 1953 — 2 Sheets-Sheet 2
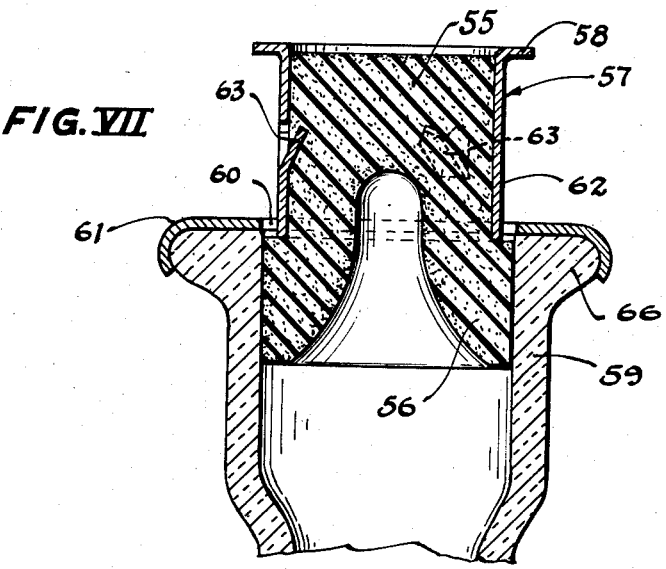
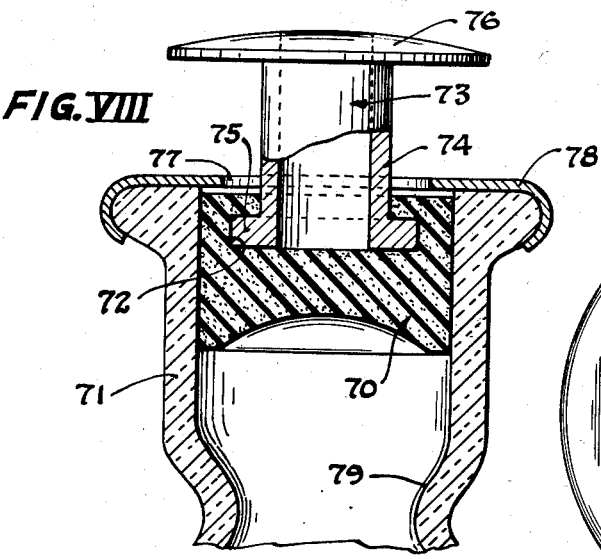
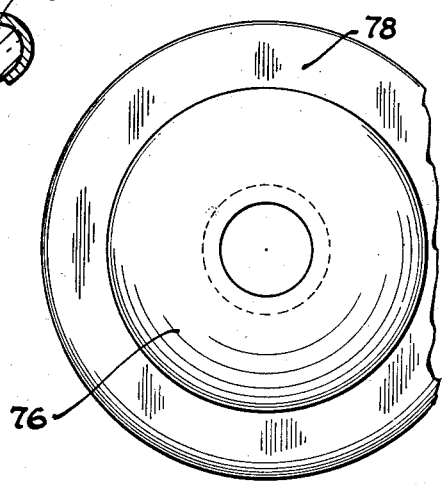
Inventor
ALBERT F. BUJAN
By William E. Dominick
Attorney

United States Patent Office 2,908,274
Patented Oct. 13, 1959

2,908,274

CLOSURE

Albert F. Bujan, Waukegan Township, Lake County, Ill., assignor to Abbott Laboratories, North Chicago, Ill., a corporation of Illinois Application June 29, 1953, Serial No. 364,839

17 Claims. (Cl. 128—272)

This invention relates to plural compartment containers suitable for storing both liquid and solid ingredients separately therein and more particularly to the closure assembly for said containers.

In plural compartment containers of the general type herein disclosed, having a liquid ingredient in the upper compartment which is admixed with a dry ingredient in the lower compartment by the application of pressure to a plunger or piston closure member in contact with the upper surface of the liquid ingredient, it is highly objectionable to have the piston closure member fall into the interior of the container and come into contact with the ingredients of the container, particularly where the plunger is actuated manually and thus in a non-sterile condition. The piston-type closures heretofore used, however, frequently are inadvertently forced into the upper compartment of the container and contaminate the contents thereof.

It is therefore an object of the present invention to provide an improved plural compartment container the contents of which are not readily contaminated by the closure member.

It is another object of the present invention to provide an improved piston closure member for a plural compartment container.

It is still another object of the invention to provide a piston closure means for a plural compartment container which substantially eliminates the possibility of the piston closure means entering the interior of the container.

Other objects of the present invention will be apparent from the drawing, the detailed description, and the claims to follow.

For a complete understanding of the present invention, reference is made to the attached drawing illustrating several embodiments of the present invention and in which:

Figure I is a side elevation view partially in vertical section of a plural compartment container embodying the present invention.

Figure II is an enlarged fragmentary vertical sectional view of the piston closure assembly in position on the container.

Figure III is a plan view of the closure assembly shown in Figure II.

Figure IV is an enlarged fragmentary vertical sectional view showing a modified form of the piston closure assembly shown in Figure II.

Figure V is an enlarged plan view of the modified form of the invention shown in Figure IV.

Figure VI is an enlarged fragmentary vertical sectional view of a further modified form of the piston closure member shown in Figure II.

Figure VII is an enlarged fragmentary vertical sectional view showing a still further modified form of the piston closure assembly shown in Figure II.

Figure VIII is an enlarged fragmentary vertical sectional view of a still further modified form of the invention shown in Figure II.

Figure IX is an enlarged plan view of the modified form of the invention shown in Figure VIII.

In Figures I through III of the drawing, in which like numerals identify similar parts, one embodiment of the present invention is illustrated by way of example and comprises a two compartment container 11 preferably of transparent material, such as glass or a transparent plastic, to permit inspection and observation of the contents. The compartmentalized container 11 is closed at one end with an integral end wall 12 providing a flat base for the container body. The compartments 13, 14 of the container 11 are defined by preferably cylindrical walls having inwardly tapering sections intermediate the upper and lower portions thereof defining a section of reduced diameter 15 which has a short section with substantially vertical lateral walls 16 suitable for retaining a center seal member 17. At the upper end of the container the lateral walls thereof are provided with an upwardly and inwardly inclined tapered section 18 merging into a second section of reduced diameter forming an elongated tubular neck section 19 serving as the single outlet and inlet opening or mouth for the container. At the lower edge of the neck section 19 there is provided on the inner surface thereof an inwardly extending ring section 20 which serves to limit the length of the neck section and beyond which the container proper is enlarged to receive a free plug similar to said piston body if pushed thereinto. A closure member composed of a flexible, resilient material, such as a natural rubber containing composition, is slidably and snugly fit in said neck section. The closure member is comprised preferably of a lower piston plug section 21 comprising a cylindrical piston body having substantially cylindrical lateral walls and a diameter slightly larger than that of the neck section 19 of the container so that a fluid-tight seal is formed between the piston section 21 and the neck section of the container 11. An integral thrust member or post 22 comprising a cylindrical section of slightly smaller diameter than the piston section 21 extends upwardly from the piston section 21. At the upper edge of the thrust section 22 a flange section or head 23 extends laterally therefrom which preferably has a diameter substantially larger than the internal diameter of the neck portion 19 of the container to limit the inward travel of said piston plug and thrust member in said neck section and which is spaced upwardly from the end of said container the distance the said body is to be slid forwardly into said neck. The combined length of said piston body and thrust position inwardly from the said head is such relative to the length of said neck as to assure sealing retention of said piston body in said neck when the said head is thrust forwardly to abut the outer end of the container structure. The upper surface of the flange section 23 of the closure stopper has preferably a plane horizontal surface preferably with indicia 26 thereon which serves to identify the portion of the closure through which a withdrawing hypodermic syringe needle should be inserted. The inner surface of the closure member is recessed, as at 27, to provide the closure member at the center thereof with a diaphragm of reduced thickness through which the withdrawing hypodermic syringe needle may be readily inserted.

The beaded neck portion 19 of the container has a lip surface or lip means which serves as a cap anchorage means 28 and to which is preferably secured a ferrule member or capping ring or collar 29 of plastic or metal, as a closure securing or retaining means. The ferrule member 29 has an axial opening or center hole 30 therethrough of a diameter slightly less than the maximum diameter of the piston section 21 of the closure plug so as to positively restrain the outward travel of the plug body. At diametrically opposite points of the ferrule member or collar 29 there is provided enlarged openings in the ferrule section 31, 32, each having a width preferably at least as wide as the thickness of the enlarged flange section 23 of the closure plug and the combined length of the opening through the ferrule member 29 forming a generally oblong hole and being preferably greater in length than the diameter of the flange section or head 23 of the closure member. The collar 29 also has marginal edge portions laterally spaced a distance less than the diameter of the said piston body which constitute stop means for the outwardly sliding of the said plug. The ferrule section 29 is provided with a depending flange 33 which is adaptable for engaging securely the beaded lip surface 28 of the container 11.

The modified form of the invention shown in Figures IV and V of the drawing is similar to the invention shown in Figures I through III except that in place of the enlarged integral flange section 23 provided on the upper edge of the thrust member 22 of the closure member shown in Figure II, there is secured to the upper surface of the cylindrical thrust member 40 of the closure member a thin circular washer member 41, preferably of metal or plastic, having a diameter substantially larger than the diameter of the neck section or of the opening 42 in the ferrule member 43 or of the container. The washer member 41 is also provided with an axial opening 44 therethrough to permit insertion of a withdrawing hypodermic syringe needle through the closure member. As in the embodiment shown in Figures I through III, the modified form of the closure member shown in Figures IV and V is also provided on the inner surface of the piston section 45 with a recessed section 46 which forms a diaphragm of reduced thickness through which the withdrawing needle can be readily inserted. The ferrule member 43 is secured firmly to the lip surface 47 of the container.

The modified form of the invention shown in Figure VI is similar to that of Figure II except that the upper enlarged integral flange section 50 is provided with an axial recessed section 51 which serves to identify the section through which the withdrawing hypodermic needle should be inserted and also assists in forming a self-sealing diaphragm section of reduced thickness in cooperation with the recessed section 52 on the inner surface of the closure member. A ferrule member 53 is secured to the neck section 54 of the container and prevents the closure member becoming disengaged from the container.

The modified form of the invention of Figure VII illustrates one form of closure member having an increased degree of rigidity. In the latter modification, the upwardly projecting integral thrust section 55 extending from the piston section 56 is provided with a rigid, form retaining grommet or sheath 57 of metal or plastic which has a diameter substantially the same as that of the thrust section 55 of the closure member. The upper edge of the grommet is provided with an outwardly projecting flange section 58 which has a diameter slightly larger than the diameter of the neck section 59 and of the opening 60 in the ferrule member 61. Intermediate the upper and lower edges of the grommet 57 there is provided at spaced portions about the lateral surface 62 thereof a plurality of inwardly and upwardly extending projections 63 which are formed integrally with the lateral surfaces 62 of the grommet 57 and which are adaptable for securely engaging the thrust section 55 of the closure member. As in the preceding modified forms of the invention, a ferrule 61 is preferably secured to the lip section 66 of the neck section 59.

In the modified form of the invention shown in Figures VIII and IX the closure member is formed by providing a cylindrical piston section 70 composed of a rubber or plastic composition having a diameter slightly larger than the internal diameter of the neck portion of the container so that a fluid-tight seal is formed at the cylindrical walls of the container neck section 71. The upper surface of the cylindrical piston section is provided with a cavity 72 extending inwardly from the upper surface thereof which serves as a retaining means for an actuating means 73. The actuating means 73 is adapted to being removably secured in the cavity 72 and is comprised of a generally cylindrical tubular thrust member 74 having at one end thereof a flange section 75 of substantially the same dimensions as the cavity 72 in the upper surface of the cylindrical piston section 70. The upper end of the cylindrical tubular thrust member 74 of the actuating means 73 is provided with an enlarged section 76, preferably circular in form, which has a diameter larger than the internal diameter of the neck 71 of the container or of the opening 77 in the ferrule 78 when a ferrule is used in the closure assembly. The lower surface of the piston section 70 is provided with a concave surface to form a diaphragm section of reduced thickness. The lower end of the neck section has an inwardly extending ring section 79 encircling the lower end of the neck section which serves as an abutment for the piston section 70.

The closure assembly shown in Figures I through III is formed by first inserting the piston section 21 of the closure member into the neck section 19 of the filled container 11 with the recessed surface 27 of the piston section proximate to the liquid in the upper section of the container. The internal volume of the container 11 is so adjusted that when the required amount of liquid is placed into the upper chamber 13 of the container there is sufficient room in the neck section 19 of the container to permit the piston section 21 of the closure member being inserted entirely within the neck section 19 of the container 11. Thereafter the ferrule member 29 is placed in position upon the lip surface 28 of the container 11 by first sliding the flange section 23 of the closure member through the enlarged opening in the ferrule and thereafter crimping the depending flange 33 of the ferrule securely about the lip surface 28 of the container, thereby preventing the piston section being forced or pulled away from the neck section 19. If desired, a rigid protective dust cap may be inserted over the closure member and ferrule to prevent contamination or accidental pressure being applied to the protruding thrust section of the closure member. The protective cap is preferably made of a light plastic or metallic material.

In operation the embodiment of the invention shown in Figures I through III, wherein the filled container has a solid ingredient in the lower chamber and a solvent therefor in the upper chamber, has mechanical pressure applied to the thrust section 22 and a flange section 23 of the closure member so that the piston section 21 is forced inwardly until the flange section 23 of the closure member engages the upper surface of the ferrule 29, whereupon movement of the closure member is stopped and continued pressure will not cause the closure member to enter the upper chamber 13 of the container. As a result of mechanical pressure being applied to the closure member, fluid pressure transmitted through the liquid in the upper chamber 13 causes the center seal 17 to be displaced downwardly permitting the solid ingredient and the solvent therefor to intermix and form a solution of the solid ingredient. After thoroughly mixing the ingredients to form the desired solution, the upper surface of the closure plug is sterilized as by wiping with alcohol, and a hypodermic syringe needle (not shown) is inserted through the diaphragm of the closure plug and the medicinal solution withdrawn from the container.

The closure assembly shown in Figures IV and V is formed by inserting the piston section of the closure member into the neck section of the container as in the previous embodiment of the invention. Thereafter the ferrule is crimped upon the lip surface of the container after freely passing over the outwardly projecting cylindrical thrust member. On the upper plane surface of the thrust member is then secured the washer member 41, which has a diameter larger than the opening of the ferrule, by means of an adhesive (metal to rubber), such as rubber chloride in methyl ethyl ketone as the solvent.

In operation of the closure assembly shown in Figures IV and V mechanical pressure is applied to the washer member 41 in the same manner as in the embodiment of the invention shown in Figures I and III, whereby the piston section 45 is forced inwardly until the washer member 41 contacts the upper surface of the ferrule member 43 and further inward movement of the piston section 45 is prevented. As in the previous embodiment of the invention, fluid pressure transmitted through the liquid causes the center seal of the container to be displaced downwardly permitting the solvent to intermix with the solid ingredient in the lower chamber of the container. After thoroughly mixing the ingredients to form the desired solution and after the outer surface of the diaphragm is sterilized, a hypodermic syringe needle is inserted through the opening 44 in the washer member 41 into the interior of the container and the fluid contents withdrawn as desired.

The modified form of the invention shown in Figure VI is assembled and operates in precisely the same manner as the embodiment shown in Figures I through III.

The modification of the invention shown in Figure VII is assembled by inserting the piston section 56 of the closure member into the neck portion 59 of the container until the piston section is entirely within the neck section. The ferrule member 61 is then seated over the thrust member 55 and is crimped in position on the lip surface 66 of the neck section. The rigid grommet 57 with the outwardly extending flange section 58 uppermost is then inserted over the thrust member 55 so that the inner end thereof contacts the upper surface of the piston section 56. The integral projections 63 extending from the lateral surface 62 of the grommet are then forced into the lateral surface of the thrust member 55 to secure the grommet 57 to the thrust member 55.

In operation of the embodiment of the invention shown in Figure VII mechanical pressure is applied to the upper surface of the thrust member 55 and grommet flange 58 causing the piston section 56 to move inwardly until the flange section 58 contacts the upper surface of the ferrule member 61 preventing further inward movement of the piston section 56 of the closure member. As in the previous embodiments of the invention, fluid pressure causes the center seal to be displaced downwardly permitting the solvent to admix with the solid ingredient forming the desired solution. After sterilizing the outer surface of the diaphragm, a hypodermic syringe needle is inserted through the diaphragm and the fluid contents withdrawn as desired.

The modified form of the invention shown in Figures VIII and IX is assembled in operating position by inserting the piston section 70 into the interior of the neck section 71 until the piston is entirely within the said neck section 71. A ferrule member 78 having an opening 77 therethrough which is slightly larger than the flange section 75 of the thrust member is then secured to the lip surface of the neck section. The actuating means 73 is finally inserted in cavity 72 to provide the piston section with a tubular thrust member and restraining means.

In operating the embodiment of the invention shown in Figures VIII and IX mechanical pressure is applied to the enlarged section 76 of thrust member 74 causing the piston section 70 to be forced downwardly against the fluid in the upper chamber of the container and thereby displacing downwardly the center seal permitting the fluid to intermix with the solid ingredient in the lower section of the container. After the ingredients have been thoroughly mixed and are ready for use, the actuating means 73 may be disengaged from the piston section to facilitate sterilization and introduction of the hypodermic syringe needle through the diaphragm of the piston section, or if desired, the hypodermic needle may be inserted by passing between the walls of the tubular actuating means, through the piston section, into the interior of the container. If the actuating means is removed from the piston section prior to inserting the hypodermic syringe needle, the shoulder or ring section 79 at the lower end of the neck section provides the necessary resistance to prevent the piston section 70 being forced into the interior of the container when the hypodermic syringe needle is forced through the diaphragm of the piston section.

While the containers of the present invention are particularly suitable for use as containers for medicinal products, it should be understood that other materials, such as adhesives, readily decomposable chemicals, and food compositions, can also be stored in the containers of the present invention in a dry state and mixed with the desired solvent immediately before use. The present invention therefore is not restricted to any particular field of use.

Others may readily adapt the invention for use under various conditions of service, by employing one or more of the novel features disclosed or equivalents thereof. As at present advised with respect to the apparent scope of my invention, I desire to claim the following subject matter.

I claim:

1. A closure assembly for a container having a single outlet means, comprising in combination; a container outlet closure having at one end thereof a penetrable resilient section which is reciprocably disposed within the said outlet means and which forms a sealing engagement therewith, a thrust member extending from the said resilient section having a small diameter section which has a diameter less than the diameter of the said resilient section, said thrust member having associated therewith at the outer end thereof an enlarged section having a diameter greater than the said small diameter section of the thrust member said enlarged section being penetrable by a hypodermic needle, and a ferrule member having an opening therethrough which has a diameter greater than the diameter of the said small diameter section of the thrust member and smaller than the diameter of the said enlarged section of the thrust member, said ferrule member being disposed about the said small diameter section of the thrust member intermediate the extremities thereof and being fixedly secured to the said outlet means of the container; whereby the said thrust member of the closure is positively restrained from coming into contact with the interior of the container.

2. A piston closure assembly for a plural compartment container having a single outlet means, comprising in combination; a container closure having at one end thereof a penetrable resilient piston section reciprocably disposed within the outlet means of the container and forming a sealing engagement with the said outlet means, an integral penetrable thrust member extending from the said piston section and having a section of substantially uniform diameter smaller than the diameter of the said piston section, said thrust member having at the outer end thereof an integral laterally extending section, said laterally extending section having a diameter greater than the diameter of the said section of uniform diameter of the thrust member and being penetrable by a hypodermic needle, and a ferrule member disposed on the said outlet means having an opening therethrough which has a diameter larger than the section of uniform diameter of the thrust member and smaller than the respective diameters of the said flange section and the said piston section, said ferrule member being disposed about the section of uniform diameter of the thrust member intermediate the extremities thereof and being fixedly secured to the said outlet means of the container; whereby the said thrust member of the closure is positively restrained from coming into contact with the contents of the container and the said piston section is prevented from becoming disengaged from the said container outlet means.

3. A piston closure assembly for a plural compartment container having a single cylindrical outlet means, comprising in combination; a container closure having at one end thereof a penetrable resilient cylindrical piston section reciprocably disposed within the outlet means of the container and forming a sealing engagement with the said outlet means, an integral penetrable thrust member extending from the said piston section and having a cylindrical section of substantially uniform diameter smaller than the diameter of the said piston section, said thrust member having at the outer end thereof an integral laterally extending section, said laterally extending section having a diameter greater than the diameter of the said section of uniform diameter of the thrust member and being penetrable by a hypodermic needle, and a ferrule member having an axial opening therethrough which has a diameter larger than the section of uniform diameter of the thrust member and smaller that the respective diameters of the said flange section and the said piston section, said ferrule member being disposed about the section of uniform diameter of the thrust member intermediate the extremities thereof by having at diametrically opposite points of the said opening enlargements therein providing a passage suitable for receiving therethrough the flange section of the thrust member and being fixedly secured to the said outlet means of the container; whereby the said thrust member of the closure is positively restrained from coming into contact with the contents of the container and the said piston section is prevented from becoming disengaged from the said container outlet means.

4. A piston closure assembly for a plural compartment container having a single outlet means, comprising in combination; a container outlet closure having at one end thereof a penetrable resilient piston section which is reciprocably disposed within the said container outlet means and which forms a sealing engagement therewith, a penetrable thrust member extending from the said piston section having a small diameter section which is less than the diameter of the said piston section, said thrust member having associated therewith at the end remote from the said piston section at least one laterally extending section providing at the said end an enlarged section having a diameter greater than the diameter of the said small diameter section, said laterally extending section comprising a relatively thin substantially non-deformable member secured to the upper surface of the said thrust member, said thin non-deformable member having an opening therethrough of sufficient diameter to permit the passage of a hypodermic needle, and a ferrule member having a passage therethrough which has a diameter larger than the diameter of the said small diameter section of the thrust member and smaller than the respective diameters of the said piston section and the said enlarged section of the thrust member, said ferrule member being disposed about the said small diameter section of the thrust member intermediate the extremities thereof and being secured to the said outlet means of the container; whereby the said thrust member of the closure is positively restrained from coming into contact with the contents of the container and the said piston section is prevented from becoming disengaged from the said container outlet means.

5. An improved closure for a container having a single outlet means, comprising; a penetrable resilient piston section which is reciprocably disposed within the said container outlet means and which forms a sealing engagement therewith, a thrust member extending from the said piston section having a section of smaller diameter than the diameter of the said piston section which together with the said piston section sealably closes the said container and forms a penetrable diaphragm for direct access therethrough into the interior of the said container, said thrust member having associated therewith at the end remote from the said piston section a laterally extending flange section, said laterally extending section comprising a relatively thin, substantially non-deformable member extending from the upper end of the said thrust member and engages the said outlet means to restrain the inward travel of the said thrust member, said relatively thin non-deformable member having a passage therethrough of sufficient diameter to permit insertion of a hypodermic needle therethrough into the interior of said container; whereby the said thrust member is positively restrained from coming into contact with the contents of the container.

6. A piston closure assembly for a plural compartment container, comprising in combination; a single container outlet closure having at one end thereof a penetrable resilient piston section which is reciprocably disposed within the said container outlet means and which forms a sealing engagement therewith, an integral penetrable thrust member extending from the said piston section having a section of reduced diameter less than the diameter of the said piston section, a substantially rigid tubular sheath member fixedly secured to the said section of the thrust member, said sheath member having at the outer end thereof an integral laterally extending flange section the diameter of which is greater than the diameter of the said thrust member, said sheath member also having a passage therethrough of sufficient diameter to permit the insertion of a hypodermic needle into the interior of the said container, and a ferrule member having an axial opening therethrough which has a diameter larger than the diameter of the said section of uniform diameter of the thrust member and smaller than the respective diameters of the said piston section and the said laterally extending flange section, said ferrule member being disposed about the said section of reduced diameter of the thrust member intermediate the extremities thereof and being fixedly secured to the said outlet means of the container; whereby the said thrust member of the closure is positively restrained from coming into contact with the contents of the container and the said piston section is prevented from becoming disengaged from the said container outlet means.

7. An improved container closure for a container having a single outlet means comprising; a penetrable resilient piston section which is reciprocably disposed within and sealably closes the said container outlet means and which forms a sealing engagement therewith, a penetrable thrust member extending from the said piston section which has a section of reduced diameter smaller than the diameter of the said piston section, a substantially rigid tubular sheath member secured to the said section of reduced diameter of the thrust member, said sheath member having a passage therethrough of sufficient diameter to permit insertion of a hypodermic needle into the said container, and said sheath member also having at the outer end thereof an integrally associated laterally extending flange section which engages the said outlet means and positively restrains the inward travel of the said thrust member; whereby the said flange section of the thrust member is poistively restrained from coming into contact with the contents of the container.

8. A piston closure assembly for a plural compartment container, having a single outlet means, comprising in combination; a container outlet closure having at one end thereof a penetrable resilient piston section which is reciprocably disposed within the said container outlet means and which forms a sealing engagement therewith, said piston section having a recessed portion disposed in the upper surface thereof suitable for retaining therein one end of a thrust member, a thrust member secured to the said piston section with an enlarged end thereof disposed in the said recessed portion of the piston section, said thrust member having a small diameter section the diameter of which is less than the diameter of the said piston section and having at the outer end thereof an integrally associated laterally extending flange section the diameter of which is greater than the diameter of the said small diameter section of the thrust member, said thrust member having a passage therethrough of sufficient diameter to permit the insertion of a hypodermic needle into the interior of the said container, and a ferrule member having an axial opening therethrough which has a diameter greater than the diameter of the said small diameter section of the thrust member and smaller than the respective diameters of the said piston section and the said flange section, said ferrule member being disposed about the said small diameter section of the thrust member intermediate the extremities thereof and being fixedly secured to the said outlet means of the container; whereby the said thrust member of the closure is positively restrained from coming into contact with the contents of the container and the said piston section is prevented from becoming disengaged from the said container outlet means.

9. An improved container closure for a container having a single outlet means comprising; a penetrable resilient piston section which is reciprocably disposed within which sealably closes the said container outlet means and which forms a sealing engagement therewith, said piston section having a recessed portion disposed in the upper surface thereof suitable for retaining therein one end of a thrust member, a thrust member secured to the said piston section with an enlarged end thereof disposed in the said recessed portion of the piston section, said thrust member having a diameter less than the diameter of the said piston section, said thrust member also having a passage therethrough of sufficient diameter to permit the insertion of a hypodermic needle into the interior of the said container and also having at the outer end thereof an integrally associated laterally extending flange section which engages the outlet means and positively restrains the inward travel of the said thrust member; whereby the said flange section of the thrust member is positively restrained from coming into contact with the contents of the container.

10. In a plural compartment container having a single outlet means provided with a ferrule member having an opening therethrough of a diameter less than the said outlet means which is disposed on the said outlet means and which has at diametrically opposite points of the said opening enlargements therein providing a passageway with a length greater than the diameter of the said opening, the improved closure means comprising a resilient penetrable piston member being reciprocably disposed within the said outlet means of the container and forming a sealing engagement therewith, a penetrable thrust member extending from the said resilient member and capable of transmitting a longitudinal force to the said resilient member, said thrust member having a smaller diameter than the diameter of the said piston member and capable of being inserted into the said opening of the said ferrule member, said thrust member having disposed at the outer end thereof a laterally extending section the diameter of which is larger than the diameter of the said opening in the said ferrule and being penetrable by a hypodermic needle, whereby the said laterally extending section may be inserted through the said passageway in the ferrule member prior to securing the ferrule member to the outlet means; thereby providing means for restraining the thrust member from entering the interior of the said container when the thrust member is used to transmit a longitudinal force to the said resilient member.

11. Plunger closure means for containers comprising, in combination with a tubular container neck having an elongated section of substantially uniform diameter terminating outwardly in a mouth defined by lip means of certain lateral dimension; of a unitary piston plug structure comprising an elongated cylindrical piston body of elastic material snugly and slidably fitted in said neck section for piston action, a thrust post integral with said body and of a diameter less than that of the latter coaxially extending outwardly therefrom an appreciable distance beyond said lip means, and an enlarged head on said post spaced outwardly from said lip means the distance said body is to be slid forward into said neck, said head being of a lateral shape and dimension as to assure abutment thereof against said lip means to limit inward travel of said piston plug in said neck section, said neck being of limited length with the container proper enlarged beyond the inner end thereof loosely to receive a free plug similar to said piston body if pushed thereinto, the combined length of said piston body and thrust post inward from said head being such relative to the length of said neck as to assure sealing retention of said body in said neck when said head is thrust forward to abutment of said lip means.

12. Plunger closure means for containers comprising, in combination with a tubular container neck having a mouth defined by lip means of certain lateral dimension; of a piston plug comprising a piston body slidably fitted in said neck, a thrust post connected to said body and extending outwardly therefrom an appreciable distance beyond said lip means, an enlarged head on said post spaced outwardly from said lip means the distance said body is to be slid forward into said neck, said head being of a lateral shape and dimension as to assure abutment thereof against said lip means to limit inward travel of said piston plug, at least portions of said lip means being formed as cap anchorage means, and an additional capping ring anchored to said cap anchorage means with said thrust post extending out through a hole in said ring, said ring having means projecting laterally inward into the path of said plug body whereby said ring provides stop means for outward travel of said plug body.

13. Plunger closure means for containers comprising, in combination with a tubular container neck of certain length and internal diameter having a mouth defined by a circular beaded lip; of a piston plug comprising a piston body of elastic material of certain length and a diameter slightly larger than the internal diameter of said neck slidably to fit snugly in the latter and having inner and outer ends, a thrust post integral with said body extending coaxially outward from the outer end of the latter, and an enlarged head on the outer end of said post located a distance from the body inner end which assures retention of said body in said neck with inward thrust juxtapositioning of said head to said lip; and a capping collar anchored over said beaded lip about said post with a through hole in said collar having portions of the marginal edge thereof juxtaposed to said post and underlying said head to constitute stop means for inward thrust motion of said plug, said marginal edge collar portions being laterally spaced a distance less than the diameter of said piston body to constitute stop means for outward sliding of said plug.

14. Plunger closure means for containers comprising, in combination with a tubular container neck having an elongated section of substantially uniform diameter terminating outwardly in a mouth end defined by lip means comprising the said end having an overlapping capping ring of certain lateral dimension secured thereto; of a unitary piston plug structure comprising an elongated cylindrical piston body of elastic material snugly and slidably fitted in said neck section for piston action, a thrust post integral with said body and of a diameter less than that of the latter coaxially extending outwardly therefrom an appreciable distance beyond said lip means, and an enlarged head on said post spaced outwardly from said lip means the distance said body is to be slid forward into said neck, said head being of a lateral shape and dimension as to assure abutment thereof against said lip means to limit inward travel of said piston plug in said neck section, said neck being of limited length with the container proper enlarged beyond the inner end thereof loosely to receive a free plug similar to said piston body if pushed thereinto, the combined length of said piston body and thrust post inward from said head being such relative to the length of said neck as to assure sealing retention of said body in said neck when said head is thrust forward to abutment of said lip means.

15. Plunger closure means for containers comprising, in combination with a tubular container neck having a mouth end defined by lip means comprising the said end having an overlapping capping ring of certain lateral dimension secured thereto; of a piston plug comprising a piston body slidably fitted in said neck, a thrust post connected to said body and extending outwardly therefrom an appreciable distance beyond said lip means, an enlarged head on said post spaced outwardly from said lip means the distance said body is to be slid forward into said neck, said head being of a lateral shape and dimension as to assure abutment thereof against said lip means to limit inward travel of said piston plug, said thrust post extending out through a hole in said capping ring, said ring having means projecting laterally inward into the path of said plug body whereby said ring provides stop means for outward travel of said plug body.

16. Plunger closure means for a container having an elongated beaded neck comprising, in combination; a capping ring adapted to be anchored on the end of the beaded neck and having a central hole; and a unitary piston plug of elastic material having a substantially cylindrical piston body slidably to fit snugly in the neck, an elongated thrust post coaxially extending from said body and a transverse head on the outer end of said post; said ring hole and said head initially being of such relative lateral shapes and dimensions as to facilitate interengaging insertion of the head through the hole, said plug being mounted to said ring with said post slidably mounted through the hole and with said head and piston bodies disposed on opposite sides of said ring, said head and said piston body having portions extending laterally of marginal edge portions of the hole with the latter forming stop means for axial inward and outward sliding of said plug relative to said ring.

17. Plunger closure means for a container having an elongated neck terminating in a beaded lip comprising, in combination; a capping ring having a skirt to telescope down over the beaded lip for anchorage thereto and a transverse top portion having an oblong hole therein; and a unitary piston plug of elastic material having a cylindrical piston body, a coaxial elongated thrust post of lesser diameter slidably received through the oblong hole and a circular lateral head of greater diameter than said post; said piston body and head being disposed on opposite sides of said ring top portion with the length of the oblong hole being greater than the diameter of said head and the width of the hole being less than the diameters of said piston body and head.

References Cited in the file of this patent

UNITED STATES PATENTS

| | | |
|---|---|---|
| 1,272,742 | Weguelin et al. | July 16, 1918 |
| 1,775,329 | Sprague | Sept. 9, 1930 |
| 2,549,417 | Brown | Apr. 17, 1951 |
| 2,659,509 | Yue San Fong | Nov. 17, 1953 |

FOREIGN PATENTS

| | | |
|---|---|---|
| 416,385 | France | Oct. 5, 1910 |
| 29,080 | Great Britain | Dec. 1, 1910 |
| 503,143 | Belgium | May 31, 1951 |